Figure 1:
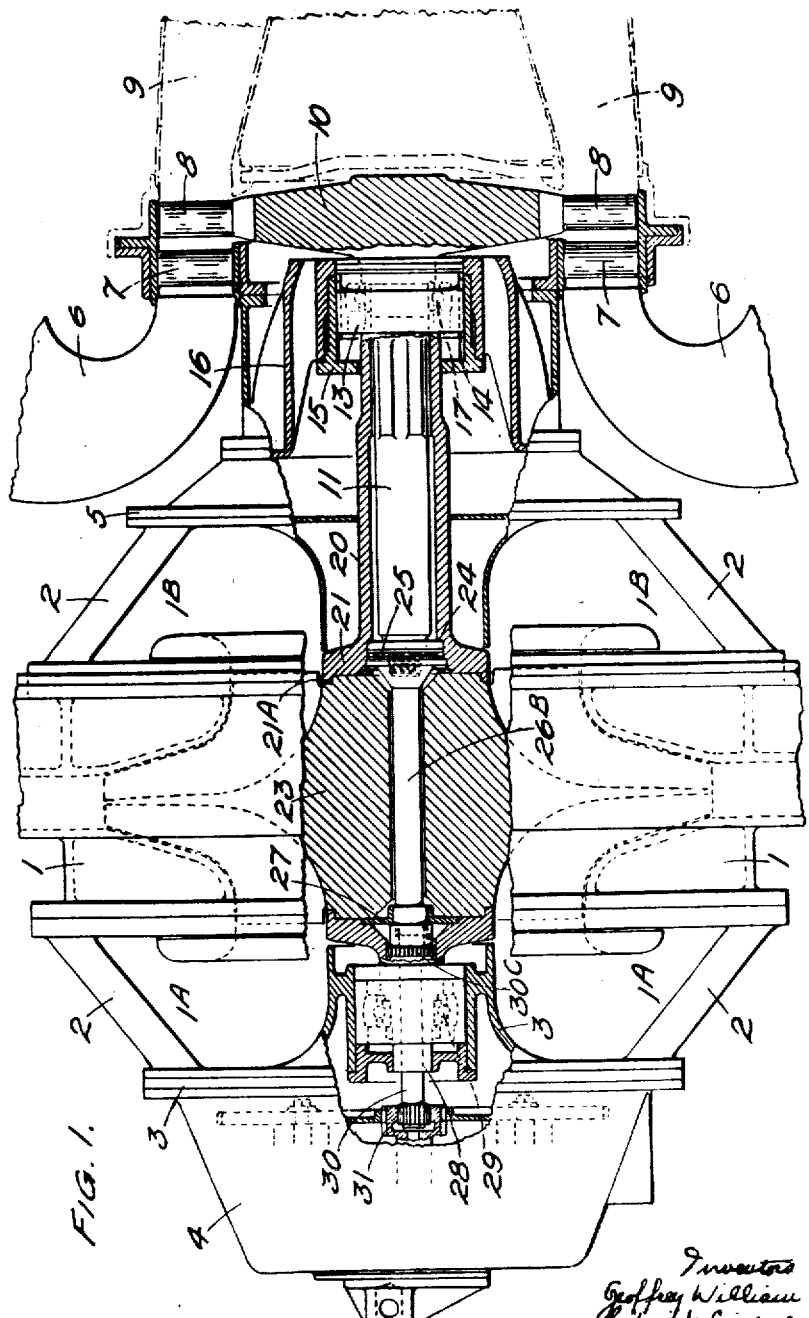

July 18, 1950 R. C. McLEOD ET AL 2,516,066
ROTOR ASSEMBLY
Filed Nov. 26, 1945 2 Sheets-Sheet 2
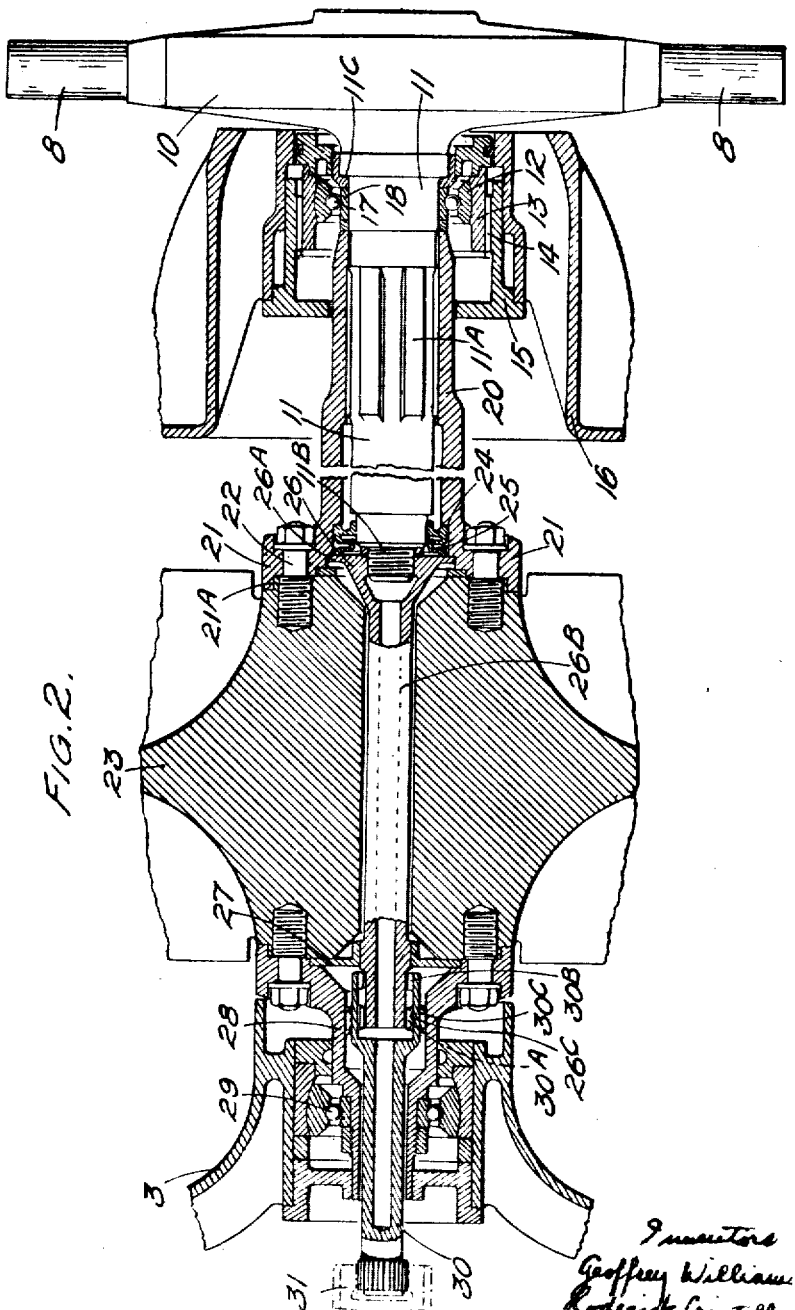

Patented July 18, 1950

2,516,066

UNITED STATES PATENT OFFICE 2,516,066

ROTOR ASSEMBLY

Roderick Cristall McLeod, Cropston, and Thomas Edward Callister, Barrow-in-Furness, England, Kenneth Watson, Clarkston, Scotland, and Geoffrey William Bone, Skellingthorpe, England, assignors to Power Jets (Research & Development) Limited, London, England Application November 26, 1945, Serial No. 630,948 In Great Britain April 27, 1942

17 Claims. (Cl. 230—116)

This invention is concerned with the construction of rotor assemblies comprising a compressor or supercharger rotor and a second rotor element such as a turbine, a shaft coupling element, or a second compressor rotor; such assemblies are hereinafter referred to as rotor assemblies of the kind stated. It is applicable where the first main rotor unit is to be interattached coaxially in a very rigid and robust manner capable of transmitting substantial torque and other loads, with the second unit and where the nature of the assembly is such that it is desirable that the second unit should be detachable by access to the side of the first unit remote from the second. Such a case is typified in a turbo-supercharger or a gas turbine in which an air compressor and turbine are directly interconnected in which kind of apparatus there are a considerable number of important factors which are required to be met by appropriate construction and the invention seeks to meet them in a simple and comprehensive way. Apart from the primary object of constructing a self-rigid and load resisting rotor assembly an object is to provide for ease of erection and dismantling, bearing in mind the somewhat intricate casings and other surrounding parts which are normally present. Another desirable feature is that bearings should as far as possible be capable of removal as complete subassemblies for the purposes of inspection, overhaul, etc. and it may be preferable to leave such bearing assemblies uninterfered with even after partial dismantling of the complete apparatus. It is also desirable that the rotor assemblies of the kind stated should be capable of being put together for balancing, partly broken down and re-assembled in the complete apparatus in such manner that the balance originally established can be re-established with a high degree of precision simply by virtue of correct assembly. In the nature of apparatus of the kind mentioned, it may be necessary that the compressor rotor is a light-alloy component whilst the turbine is a steel or heat-resistant alloy high tensile forging, having an integral shaft; the interattachment of such units constitutes a design problem of no small difficulty in view of the widely different mechanical and thermal characteristics of the materials. As well as dealing with these objects and with design difficulties the invention has secondary objects which are more especially related to the application for which the invention is primarily intended, i. e. in a gas turbine engine for jet propulsion of aircraft or for use as a prime-mover delivering shaft power. In such more specific applications it is almost certainly required to drive auxiliaries from the main rotor assembly, and conversely to allow the rotor assembly to be driven for starting purposes; the invention includes a convenient construction of auxiliary drive shaft for use in conjunction with the main rotor assembly in connection with which difficulties of extremely precise alignment are avoided, whilst this shaft also plays an important part when the unit is being dismantled or assembled, in that it is employed as a form of key or spanner, whilst upon final assembly it is further employed as a locking device. In order that the invention may more readily be understood it will be described and stated as applied to a rotor asesmbly comprising, mainly, a centrifugal impeller and an overhung single row turbine wheel; it should be understood, however, that these components may be of different kinds, e. g. the impeller may be an axial one, or the turbine may be of multi-stage construction. It will perhaps be helpful if a previous mode of construction is briefly described in order to establish the identity of components, etc. In this previous construction, which is that of the rotor assembly in U. S. application, Serial No. 379,734, now Patent No. 2,404,334, dated July 16, 1946, the impeller was machined from a solid forging or the like and had no axial bore. To its forward end there was attached by studs through an annular flange, a tailshaft which ran in a main bearing acting both as journal and thrust (or locating) bearing of the complete rotor assembly. To the other end of the impeller there was similarly attached a quillshaft which was a hollow and massive cylindrical element axially splined through part of its length internally. The turbine disc had an integral stubshaft extending from it on one side only, embraced by the second main bearing (which was a journal bearing only) and this stubshaft was externally splined to mate with the quillshaft. The stubshaft passed through the quillshaft and as securely drawn up and locked by a nut arrangement entirely housed within the quillshaft and therefore necessitating fitting and assembly before the quillshaft was attached to the impeller. The quillshaft when being tightened in assembly with the stubshaft axially nipped and secured the inner race of the stubshaft bearing. This construction had serious drawbacks, not the least of which is the amount of fitting and assembly which has to be performed during final assembly, i. e. after balancing of the rotor assembly as a whole and subsequent detachment; and again the fact that with such an assembly it was necessary for some at least of the casings which are ultimately to enclose the rotor assembly, to be diametrically split so that they may be built around the complete assembly.

According to the present invention a construction is provided in which the two main rotor units to be comprised in a rotor assembly (e. g. the impeller and the turbine wheel) are assembled detachably as a self-rigid torque transmitting assembly characterised in that one of the units (the impeller in the case of the preferred application) has an axial bore or passage and has a hollow shaft attached to it (called a quillshaft) the quillshaft being adapted to engage torsionally and in fixed alignment and location with a stub-shaft extending rigidly from the other main rotor unit (e. g. turbine disc) and the stubshaft is drawn up axially and secured in its engagement with the quillshaft by screw means accessible through, or extending through, the bore of the former unit (impeller) and preferably of the tailshaft.

One immediate advantage of this broadly stated feature is that the turbine, stubshaft, and such bearing assembly as may be mounted upon it, are removable or replacable without the removal of the impeller of the apparatus or engine and simply by obtaining access to that end of the impeller which is remote from the turbine.

Further according to the invention the screw means referred to above consist of a shaft or nut extension passing through the bore of the former unit (impeller) and having at one end (the end nearer the latter unit, e. g. turbine) a nut or internally threaded socket and at the other end, preferably within the hollow of the tailshaft, complementary formations such as dogs or splines enabling it to be rotated during assembly or dismantling. This shaft is preferably supported as to radial location by the coaxial bore of an annular fitting accurately positioned with reference to the impeller.

Again according to the invention and where it is desired to afford a driving transmission to and from the rotor assembly as a whole, for example for auxiliary drive or starting, an auxiliary driving connection in the form of a shaft is provided which lies within the hollow of the tailshaft and projects therefrom. The concealed end of this driving connection shaft in reminiscent of a tubular or box spanner in one of its functions; this end is in the form of a hollow cylinder and it is provided internally with two axially spaced sets of splines or dogs. It is also provided externally with one set of splines and these are of a different pitch from the internal splines to achieve a vernier effect which will be mentioned later. Upon the forward end of the nut extension which passes through the impeller there is a row of splines this being external and corresponding to the two rows in the auxiliary shaft. The axial interval between the two rows of splines in the auxiliary shaft is slightly greater than the axial length of the splines on the nut extension. The function of this construction is as follows. During assembly the stubshaft having been pushed home through the quillshaft, the nut extension is rotated by means of the driving connection shaft which is slightly withdrawn for this purpose, i. e. into the position where only one of its rows of splines engages one row on the screwing spindle. The driving connection is thus used in the manner of a box spanner, and the stubshaft is drawn up as tightly as may be desired by this means. When screwing up is completed the driving connection is then pushed inwards (i. e. towards the impeller) and in an intermediate position can be freely rotated since all its splines are disengaged. A position for it is then found, having in mind the vernier effect previously mentioned, in which it can be pushed right home and in which both outer and inner splines of the auxiliary shaft are engaged, the outer with complementary splines within the quillshaft and the inner, with the splines on the screwing shaft. In this condition not only is the driving connection in positive splined connection with the rotor assembly as a whole for driving purposes, but the screwing spindle is positively locked against slackening.

Some further constructional features are included in a complete application of the invention, and will be described more fully in relation to a particular example with the aid of the accompanying drawings in which:

Fig. 1 illustrates in part section and diagrammatically, a gas turbine jet propulsion aero engine embodying the invention, redundant matter being omitted.

Fig. 2 similarly shows the arrangement of the rotor system and associated parts, on a larger scale.

The engine adopted for the purpose of example comprises a centrifugal compressor with bilateral intakes, a combustion system into which the whole air output of the compressor is led and in which liquid fuel is burnt, and a single stage gas turbine driven by the gaseous combustion product and driving the compressor mechanically. The leaving gases from the turbine constitute the propulsive jet. In Fig. 1 the combustion system is omitted; it comprises a series of chambers arranged symmetrically about the axis of the machine (which is also the thrust axis) each chamber having an inlet connection from the compressor and an outlet connection to the turbine.

In the drawings, the compressor casing 1 has air intakes 1A, 1B, and these are spanned by lattice-like struts 2 which connect the casing 1 to a forward structure 3, mounting an auxiliary gearbox 4, and to a rearward structure 5 which comprises a bearing housing in which is mounted the turbine bearing. Towards or at the periphery of the casing 1 (and not shown on the drawings) are a series of outlets which are connected by ducts to air casings of the combustion system, from which the combustion products are led by elbowed ducts 6 to the continous nozzle ring 7 of the turbine which has its single row of blades at 8. The leaving gases from the turbine annulus are collected by exhaust ducting indicated at 9.

The turbine comprises a disc or wheel 10 which is manufactured integrally with a stubshaft 11, as a single forging. The turbine is overhung and is supported mainly by a ball bearing arranged as follows. An outer race 12 is formed as a section of a sphere (for self-aligning purposes) and fitted in the bearing cartridge 13 which is externally splined to be a free sliding fit in internal splining at 14 within a bearing housing 15 mounted in the structure 16 which is attached to the structure 5. A row of balls 17 supports the inner race 18, which is fitted on a cylindrical part of the stubshaft 11, and is nipped axially as will be explained. The structure 16 is so formed as to comprise a series of air passages for circulation of air (by means not shown) in the neighbourhood of the turbine bearing.

The stubshaft 11 is externally splined at 11A and has at its forward end an external thread at 11B. The stubshaft 11 lies within a hollow quillshaft 20 which is internally splined to mate with the splining at 11A, these two shafts thus being drivingly interconnected. The forward end of the quillshaft is outwardly flanged at 21, the flange having counterbored holes to engage studs 22 which are screwed into sockets in the impeller 23. The flanged end 21 of the quillshaft is recessed (see 21A) to fit a shallow spigot formed on the impeller 23 to ensure concentricity. Within this end of the quillshaft is formed an annular shoulder at 24 against which seats an annular axially elastic washer 25. This washer is made elastic by shaping it as shown, with a corrugated or bellows-like section and its design and construction are such that it exerts a definite axial load when the washer is squeezed up to a known extent. It will be seen that this constitutes or affords a preload between the stubshaft 11 and quillshaft 20. Between a shoulder formed at 11C on the stubshaft and the rearward end of the quillshaft 20 (through the medium of two packing rings seen but not further described) the inner ball-race 18 is nipped and held.

The thread at 11B is engaged by a nut of special form. This comprises a circular internally threaded end 26 with a peripheral rim at 26A, which lies mainly between the end of the quillshaft 20 and the body of the impeller 23. The end 26 is formed on a tubular internal shaft 26B which lies in an axial bore through the impeller body, and projects somewhat at the forward side of the impeller, where this shaft is centred through an annular plate 27. The projecting end of the internal shaft 26B has a single row of external splines at 26C. The shaft 26B is, in fact, a nut extension.

The head 26 is in effect a nut, which when screwed home draws the quill and stub shafts together axially and compresses the washer 25 (thereby applying a predetermined frictional nip on the race 18) and finally serves as the sole retaining means of the stubshaft 11 and turbine 10. The turbine may therefore be detached by unscrewing the nut 26 (which by its rim 26A can act as an extractor if need be).

To the forward side of the impeller 23 a tailshaft 28 is attached, in like manner to the attachment of the quillshaft. This tailshaft is hollow, and is externally borne by a journal and thrust bearing at 29, supported by the forward structure 3 of the engine. There are of course at both bearings of the rotor system, appropriate lubrication and gland arrangements, which form no part of the invention.

Within the bore of the tailshaft 28 there lies a second tubular internal shaft or "spanner" 30 which is a driving connection, the inner end of which is internally splined in two axially spaced rows 30A, 30B, each of which is adapted to engage the splines 26C of the nut shaft. Externally, the shaft 30 is splined at 30C, these splines being adapted to engage internal splines in the tailshaft 28. The arrangement of the splines is preferably of vernier character so as to ensure that different precise locations of engagement can be achieved. The forward end of shaft 30 projects from the tailshaft 28 and is externally splined for engagement in a part of the mechanism comprised by the auxiliary gearbox required to be driven (e. g. a first pinion of a reduction train, indicated at 31).

In dismantling or assembly, the driving connection shaft 30 is pulled forwards disengaging the splines at 30C, and splines 30A from 26C, and engaging splines 30B with 26C. The shaft 30 is then used as a spanner to rotate shaft 26B. After assembly, the shaft 30 is pushed back and by manipulation a position is found where splines 30A will engage 26C simultaneously with engagement of splines 30C. This new engagement constitutes a positive locking of the driving connection 30 and therefore of the nut extension 26B and the nut. The assembly of the gearbox 4 to the engine now prevents shaft 30 from moving forwards so that accidental unlocking is impossible, short of some major failure.

It can be seen that the turbine can be assembled into the engine without disturbing more than the exhaust ducting 9 and the gearbox 4. Moreover it is clear that the whole of the turbine bearing is free to come away with the turbine (by sliding of the splines at 14). One important consequence of this is that assuming careful balancing and matching of parts in manufacture, a complete turbine replacement or a bearing replacement or examination can be carried out without disturbing the impeller. Since removal of the impeller involves splitting or opening up of the compressor casing, this is a substantial consideration. There is no essential need to remove or disturb any of the combustion system with its airtight joints etc. in order to remove or replace the turbine.

The splined arrangement of turbine bearing has in itself substantial functional advantages since it copes with thermal expansion effects (side-bearing splines with radial clearance are employed) and also ensures that no axial thrust can be imposed at the turbine bearing. The splined shaft couplings provided on the internal shafts and in the tailshaft, afford torsional coupling which does not require extreme precision of alignment, which fact is of assistance in that the fitting of an auxiliary gearbox is thereby facilitated.

It will be seen that the invention may be applicable in constructions where the stubshaft is not necessarily a part of a turbine; for example, there may be cases in which the rotor unit 23 is to be interattached with an element of a shaft-coupling which is in turn connected to a turbine, and in such case it may still be found convenient to adopt the proposed assembly for the purpose of making the coupling (which in this case constitutes the second rotor unit) readily detachable from the first rotor unit.

We claim:

1. A rotor assembly comprising a compressor rotor having an axial bore and a second coaxial rotor axially spaced therefrom, a hollow shaft coaxially attached to said compressor rotor and extending towards said second rotor, a second shaft coaxially rigidly extending from said second rotor towards the compressor rotor and engaged within said hollow shaft for rotation therewith, and screw connecting means internally of said shafting exposed for access thereto through said axial bore for adjustment to mutually draw together axially and secure said hollow shaft and said second shaft.

2. A rotor assembly comprising a compressor rotor with an axial bore and a second coaxial rotor element, a hollow shaft coaxially attached to said compressor rotor and extending towards said second rotor element and formed with internal splines for rotary driving engagement, a second shaft axially rigidly extending from said second rotor element and formed with external splines in complement to said internal splines and a screw-threaded extremity, and a screw-threaded element to engage said extremity and a formation of said hollow shaft to draw and secure together the two shafts, said screw-threaded element being exposed for access thereto for screwing through the bore of said compressor rotor.

3. A rotor assembly according to claim 2, in which said compressor rotor has a further hollow shaft coaxially attached thereto extending to the side thereof further from said second color element and affording bearing means for said rotor.

4. A rotor assembly according to claim 2, in which said compressor rotor has a further hollow shaft coaxially attached thereto extending to the side thereof further from said second rotor element and said screw threaded element extends through said compressor rotor into said further shaft.

5. A rotor assembly according to claim 2, in which said compressor rotor has a further hollow shaft coaxially attached thereto extending to the side thereof further from said second rotor element and said screw threaded element extends through said compressor rotor into said further shaft, further comprising means for interlocking said screw threaded element and said further shaft to prevent relative rotation.

6. A rotor assembly comprising a compressor rotor with an axial bore and a second rotor element, a hollow shaft attached coaxially to said compressor rotor and extending towards said second rotor element, a second shaft extending from said second rotor element into said hollow shaft to engage drivingly therein, screw means to mutually engage said hollow shaft internally and said second shaft to draw and secure them together, means operatively connected to said screw means extending through the bore of said compressor rotor for access on the side thereof further from said second rotor element and further from said second rotor element and means to engage said extending means and constituting a driving connection to rotate said screw means for screwing purposes and to act as a coupling for power transmission between the rotor assembly and other mechanism.

7. A rotor assembly according to claim 6, comprising a further hollow shaft coaxially attached to said compressor rotor on the side thereof further from said second rotor element, said driving connection extending axially through such further shaft.

8. A rotor assembly according to claim 6, comprising a further hollow shaft coaxially attached to said compressor rotor on the side thereof further from said second rotor element and having internally an axially engageable driving formation, and a complementary formation provided externally on said driving connection, said driving connection being accommodated in said further shaft for axial shifting to cause engagement or freeing of said formations.

9. A rotor assembly according to claim 6, comprising a further hollow shaft coaxially attached to said compressor rotor on the side thereof further from said second rotor element and having internally an axially engageable driving formation, a complementary formation provided on said driving connection said driving connection being accommodated in said further shaft for axial shifting to cause engagement or freeing of said formations, and similar complementary engaging formations on the screw extending means and in the driving connection to couple this means and extension together drivingly, said similar formations being adapted to permit uncoupling thereof dependent upon axial shift of the driving connection when freeing (as referred to above) occurs.

10. A rotor assembly comprising a compressor rotor with an axial bore and a coaxial turbine rotor, a hollow quill shaft attached coaxially to said compressor rotor and extending towards said turbine rotor, a turbine stub shaft rigid with said turbine rotor and extending axially to one side thereof to drivingly engage in said quill shaft, turbine bearing means to support said quill and stub shafts mutually, a nut adapted to screw on to the extremity of the stub shaft and having an axial extension through said bore and adapted to bear on an internal formation of the quill shaft to secure said stub shaft therein, a hollow tail shaft coaxially attached to the side of said compressor rotor further from said second rotor element, second bearing means to support said tail shaft, and an axially shiftable driving connection shaft disposed within said tail shaft and adapted to engage drivingly both said shaft and said tail shaft and by axial shift to engage or free its driving connection with said tail shaft.

11. A rotor assembly according to claim 10, wherein said turbine bearing means include an inner bearing element adapted to be secured by pinching between the end of said quill shaft and an external shoulder formation of said stub shaft.

12. A rotor assembly according to claim 10, further comprising a resilient axial loading element operatively located between said quill shaft and said nut to afford control of the axial stress imposable by said nut in drawing up said quill and stub shafts.

13. A rotor assembly according to claim 10 in which said compressor rotor is a single-stage centrifugal compressor impeller formed as a single body of light alloy.

14. A rotor assembly according to claim 10, in which said turbine bearing comprises a bearing and a bearing cartridge externally splined to be a free sliding fit in complementary splining of a bearing housing in such manner that upon freeing of said nut by unscrewing and subsequent axial withdrawal of said stub shaft from said quill shaft, the bearing cartridge and contained bearing as a unit can be axially withdrawn from the bearing housing, whilst said splining maintains coaxiality between said cartridge and the housing.

15. A rotor assembly according to claim 10 comprising external splines on said nut extension, axially interrupted splines within said driving connection shaft the interruption whereof is axially of greater length than the said external splines, external locking splines on said driving connection, and complementary internal splines in the tail shaft to engage said locking splines, said internal splines being located so as to be engaged when said driving connection is in final assembled axial position whilst free in the alternative extreme position at which the driving connection is nevertheless engaged with said extension for use as a spanner.

16. A rotor assembly comprising a compressor rotor element and a second coaxial rotor element axially spaced therefrom, one of said rotor elements having an axial bore and having in rigid coaxial association as a unit therewith a hollow shaft extending towards the other element, and said other element having also in rigid coaxial association as a unit therewith a further shaft, separate from and extending towards said hollow shaft, means for effecting torsional connection between said shafts while leaving them free for axial displacement with their respective rotor elements, and screw connecting means internally of said shafting exposed for access through said axial bore for adjustment to mutually draw together axially and secure said shafts and elements.

17. A gas turbine rotor assembly comprising a compressor rotor and a coaxial turbine rotor axially spaced therefrom, one of said rotors having an axial bore and having in rigid coaxial association as a unit therewith a hollow shaft extending towards the other rotor, and said other rotor having also in rigid coaxial association therewith a further shaft, separate from and extending towards said hollow shaft, means for effecting torsional connection between said shafts while leaving them free for axial displacement with their respective rotor elements, and screw connecting means internally of said shafting exposed for access through said axial bore for adjustment to mutually draw together axially and secure said shafts and rotors.

RODERICK CRISTALL McLEOD.
THOMAS EDWARD CALLISTER.
KENNETH WATSON.
GEOFFREY WILLIAM BONE.

REFERENCES CITED

The following references are of record in the file of this patent:

UNITED STATES PATENTS

| Number | Name | Date |
|---|---|---|
| 799,561 | Hamann | Sept. 12, 1905 |
| 1,863,529 | Symons | June 14, 1932 |
| 1,998,778 | Gregg | Apr. 23, 1935 |
| 2,341,664 | Schutte | Feb. 15, 1944 |
| 2,404,334 | Whittle | July 16, 1946 |

FOREIGN PATENTS

| Number | Country | Date |
|---|---|---|
| 74,422 | Austria | July 10, 1918 |